(12) United States Patent
Cho et al.

(10) Patent No.: US 12,442,410 B2
(45) Date of Patent: Oct. 14, 2025

(54) AIRFOIL JOURNAL BEARING

(71) Applicants: Samsung Electronics Co., Ltd., Suwon-si (KR); NEUROS CO., LTD., Daejeon (KR)

(72) Inventors: Jinwoo Cho, Suwon-si (KR); Woong Hwang, Suwon-si (KR); Kyeong Dong Kim, Sejong (KR)

(73) Assignees: SAMSUNG ELECTRONICS CO., LTD., Suwon-si (KR); NEUROS CO., LTD., Yuseong-gu (KR)

( * ) Notice: Subject to any disclaimer, the term of this patent is extended or adjusted under 35 U.S.C. 154(b) by 246 days.

(21) Appl. No.: 18/139,668

(22) Filed: Apr. 26, 2023

(65) Prior Publication Data

US 2023/0258228 A1 Aug. 17, 2023

Related U.S. Application Data

(63) Continuation of application No. PCT/KR2022/015017, filed on Oct. 5, 2022.

(30) Foreign Application Priority Data

Nov. 17, 2021 (KR) .......................... 10-2021-0158678

(51) Int. Cl.
*F16C 17/02* (2006.01)
*A47L 9/22* (2006.01)
*H02K 5/167* (2006.01)

(52) U.S. Cl.
CPC .............. *F16C 17/024* (2013.01); *A47L 9/22* (2013.01); *H02K 5/167* (2013.01); *F16C 2380/26* (2013.01)

(58) Field of Classification Search
CPC F16C 17/024; F16C 2380/26; F16C 2208/32; F16C 2220/42; F16C 2220/44;
(Continued)

(56) References Cited

U.S. PATENT DOCUMENTS

2005/0201646 A1* 9/2005 Nagata .................. F16C 27/063
384/106
2014/0376844 A1 12/2014 Swanson et al.
(Continued)

FOREIGN PATENT DOCUMENTS

JP 52-53163 4/1977
JP 2003-247542 9/2003
(Continued)

OTHER PUBLICATIONS

English translation of WO-2017043880-A1 (Year: 2017).*
(Continued)

*Primary Examiner* — Tulsidas C Patel
*Assistant Examiner* — Joshua M Rodriguez
(74) *Attorney, Agent, or Firm* — STAAS & HALSEY LLP

(57) ABSTRACT

An airfoil journal bearing journal bearing includes a bearing housing for rotatably supporting a rotation shaft and including a hollow through which the rotation shaft is inserted, and an airfoil between an inner circumferential surface of the bearing housing and an outer circumferential surface of the rotation shaft. The airfoil includes a first foil region extending in a circumferential direction and enclosing the circumference of the rotation shaft between 180 to 360 degrees, and a pair of second foil regions connected to opposite edges of the first foil region in an axial direction of the rotation shaft, extending in the circumferential direction and enclosing the circumference of the rotation shaft between 180 to 360 degrees, and including a plurality of elastic bumps formed in the circumferential direction on the surface of the second foil regions.

18 Claims, 10 Drawing Sheets

(58) Field of Classification Search
CPC .. F16C 2220/82; F16C 2223/30; F16C 33/08; F16C 43/02; F16C 27/02; F16C 32/0603; A47L 9/22; A47L 5/26; H02K 5/167
See application file for complete search history.

(56) References Cited

U.S. PATENT DOCUMENTS

| | | | |
|---|---|---|---|
| 2015/0030270 A1* | 1/2015 | Heshmat | F16C 33/108 384/106 |
| 2019/0368543 A1 | 12/2019 | Himmelmann | |

FOREIGN PATENT DOCUMENTS

| | | | | |
|---|---|---|---|---|
| JP | 2005-9556 | 1/2005 | | |
| JP | 4401704 | 1/2010 | | |
| JP | 2015-143572 | 8/2015 | | |
| JP | 2015143572 A * | 8/2015 | ............ | F01D 25/16 |
| JP | 2021-46913 | 3/2021 | | |
| KR | 10-2230226 | 3/2021 | | |
| WO | WO-2017043880 A1 * | 3/2017 | ............ | F16C 17/024 |

OTHER PUBLICATIONS

English translation of JP-2015143572-A (Year: 2015).*
European Search Report dated Jan. 15, 2025, in European Application No. EP 22 89 5846.

* cited by examiner

AIRFOIL JOURNAL BEARING

CROSS-REFERENCE TO RELATED APPLICATIONS

This application is a continuation application of International Application No. PCT/KR2022/015017 designating the United States, filed on Oct. 5, 2022, in the Korean Intellectual Property Receiving Office and claiming priority to Korean Patent Application No. 10-2021-0158678, filed on Nov. 17, 2021, in the Korean Intellectual Property Office, the disclosures of which are incorporated by reference herein in their entireties.

BACKGROUND

1. Field

The disclosure relates to an airfoil journal bearing.

2. Description of Related Art

A mechanical device, such as a vacuum cleaner and a compressor, may include a motor for rotating a rotor. The mechanical device may include a bearing for supporting rotation of a rotation shaft while constantly maintaining a position of the rotation shaft during operation of the motor. A bearing may fix a rotation shaft in a predetermined position and rotate the rotation shaft while supporting a load generated from rotation of the rotation shaft. There are various types of bearings, such as a ball bearing, a journal bearing, a foil bearing, and the like. An airfoil journal bearing may support a load in a radial direction perpendicular to an axial direction of the rotation shaft.

An airfoil journal bearing may include an airfoil for forming a fluid layer on the outer surface of the rotation shaft, and the airfoil may support a load of the rotation shaft not in contact with the rotation shaft through pressure of the fluid layer. A typical airfoil journal bearing, after separately forming a bump foil and a top foil, may have a structure assembled by stacking the bump foil and the top foil and inserting the stacked bump and top foils inside a bearing housing. In a typical structure, the bump foil and the top foil may be in separate forms, and thus, each component may need to be separately assembled and mounted to the bearing housing. Therefore, components may not be effectively managed and problems may be caused by defective assembly. In addition, a foil may be inserted, in a stacked state, into the bearing housing, and thus, thickness of the inserted foil may increase. Recently, miniaturized mechanical devices have been in demand to satisfy the desires of consumers. The demand for miniaturized mechanical devices may require miniaturization of accessories, such as a motor and a bearing. Accordingly, technology for manufacturing components in a simplified structure has been developed to minimize manufacturing tolerance and resolve an issue of a narrow assembly space.

SUMMARY

An air foil journal bearing according to an embodiment includes: a bearing housing having an inner circumferential surface forming a hollow through which a rotation shaft is insertable; and an airfoil that, when the rotation shaft is inserted through the hollow, is between the inner circumferential surface of the bearing housing and an outer circumferential surface of the rotation shaft. The airfoil includes: a first foil region that, when the rotation shaft is inserted through the hollow, extends in a circumferential direction of the rotation shaft in a range from 180 to 360 degrees around the rotation shaft, the first foil region having a first edge in a first axial direction of the rotation shaft and a second edge in a second axial direction of the rotation shaft that is the opposite to the first axial direction, and a pair of second foil regions that, when the rotation shaft is inserted through the hollow, extend in in the circumferential direction in a range from 180 to 360 degrees around the rotation shaft. Each second foil region comprising a plurality of elastic bumps in the circumferential direction of the rotation shaft on a surface of the respective second foil region. A first of the second foil regions of the pair of second foil regions extends from the first edge of the first foil region and a second of the second foil regions of the pair of second foil regions extends from the second edge of the first foil region. The first foil region, the second foil regions, and the plurality of elastic bumps of each second foil region are integrally formed together as one body.

An airfoil journal bearing according to an embodiment includes a bearing housing having an inner circumferential surface forming a hollow through which a rotation shaft is insertable, and when in the rotation shaft is inserted through hollow, a gap is formed between the inner circumferential surface of the bearing housing and an outer circumferential surface of the rotation shaft, and an airfoil that, when the rotation shaft is insert through the hollow, is in the gap, the airfoil having a first airfoil edge fixed to the bearing housing and a second airfoil edge, opposite to the first foil edge, either fixed to the bearing housing or free. The airfoil includes a first foil region that, when the rotation shaft is inserted through the hollow, is configured to receive pressure generated by rotation of the rotation shaft, wherein the first foil region extends in a circumferential direction of the rotation shaft in a range from 180 to 360 degrees around the rotation shaft, the first foil region having a first edge in a first axial direction of the rotation shaft and a second edge in a second axial direction of the rotation shaft that is the opposite to the first axial direction, and a pair of second foil regions that, when the rotation shaft is inserted through the hollow, extend in in the circumferential direction in a range from 180 to 360 degrees around the rotation shaft. Each second foil region including a plurality of elastic bumps in the circumferential direction of the rotation shaft on a surface of the respective second foil region and elastically operating by pressure upon the rotation of the rotation shaft, wherein a first of the second foil regions of the pair of second foil regions extends from the first edge of the first foil region and a second of the second foil regions of the pair of second foil regions extends from the second edge of the first foil region. The airfoil is formed from a single member.

The airfoil journal bearing may be formed from a single member by processing the single member to form the plurality of elastic bumps in each second foil region, and rolling the processed single member in a circumferential direction.

A mechanical device according to an embodiment includes: a housing; a motor inside the housing and including a rotation shaft extending in the axial direction; an impeller coupled to the rotation shaft and configured to rotate by operation of the motor; and an airfoil journal bearing for rotatably supporting the rotation shaft. The airfoil journal bearing including: a bearing housing having an inner circumferential surface forming a hollow through which the rotation shaft is inserted; and an airfoil in the hollow, forming, when the rotation shaft is rotating, an air layer between the airfoil and the outer circumferential surface of the rotation shaft, and extending along the inner circumferential surface of the bearing housing. The airfoil including: a first foil region having a smooth curved surface; and a pair of second foil regions respectively at edges of the first foil region and including a plurality of elastic bumps along a circumference of the airfoil and configured to generate elastic force upon the rotation of the rotation shaft, wherein the first foil region and the second foil regions are integrally formed.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
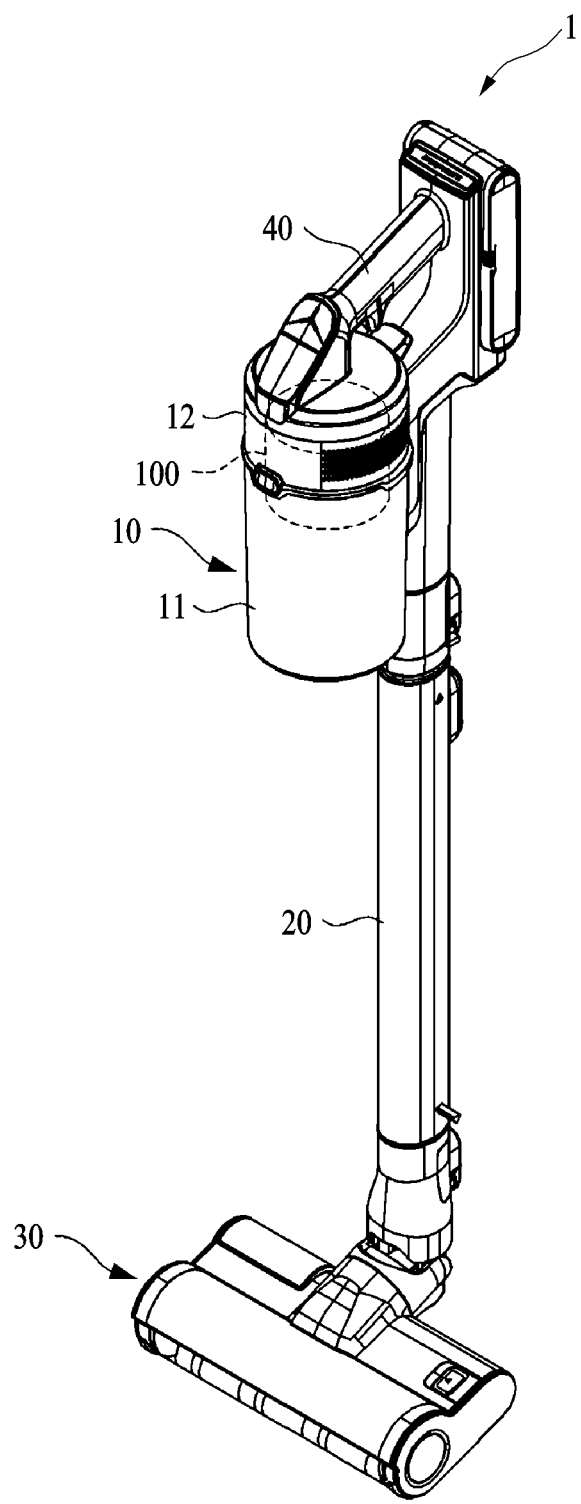
FIG. 1 is a perspective view illustrating a mechanical device according to an example embodiment.

Hereinafter, example embodiments will be described in detail with reference to the accompanying drawings. When describing the example embodiments with reference to the accompanying drawings, like reference numerals refer to like elements and a repeated description related thereto will be omitted.

Various example embodiments of the present disclosure are provided as examples to assist better understanding of technological features described herein. It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as a machine. For example, the machine (e.g., a processor of a mechanical device) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one among the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Example embodiments of the disclosure may provide a mechanical device including an airfoil journal bearing. According to example embodiments, a first foil region for receiving a load generated from rotation of a rotation shaft and a second foil region for performing a bumper function may be formed on the same plane of an airfoil. The airfoil journal bearing may be miniaturized by minimizing the thickness of airfoil.

The technical goals to be achieved through example embodiments of the present disclosure are not limited to those described above, and other technical goals not mentioned above are clearly understood by one of ordinary skill in the art from the following description.

Figure 2A:
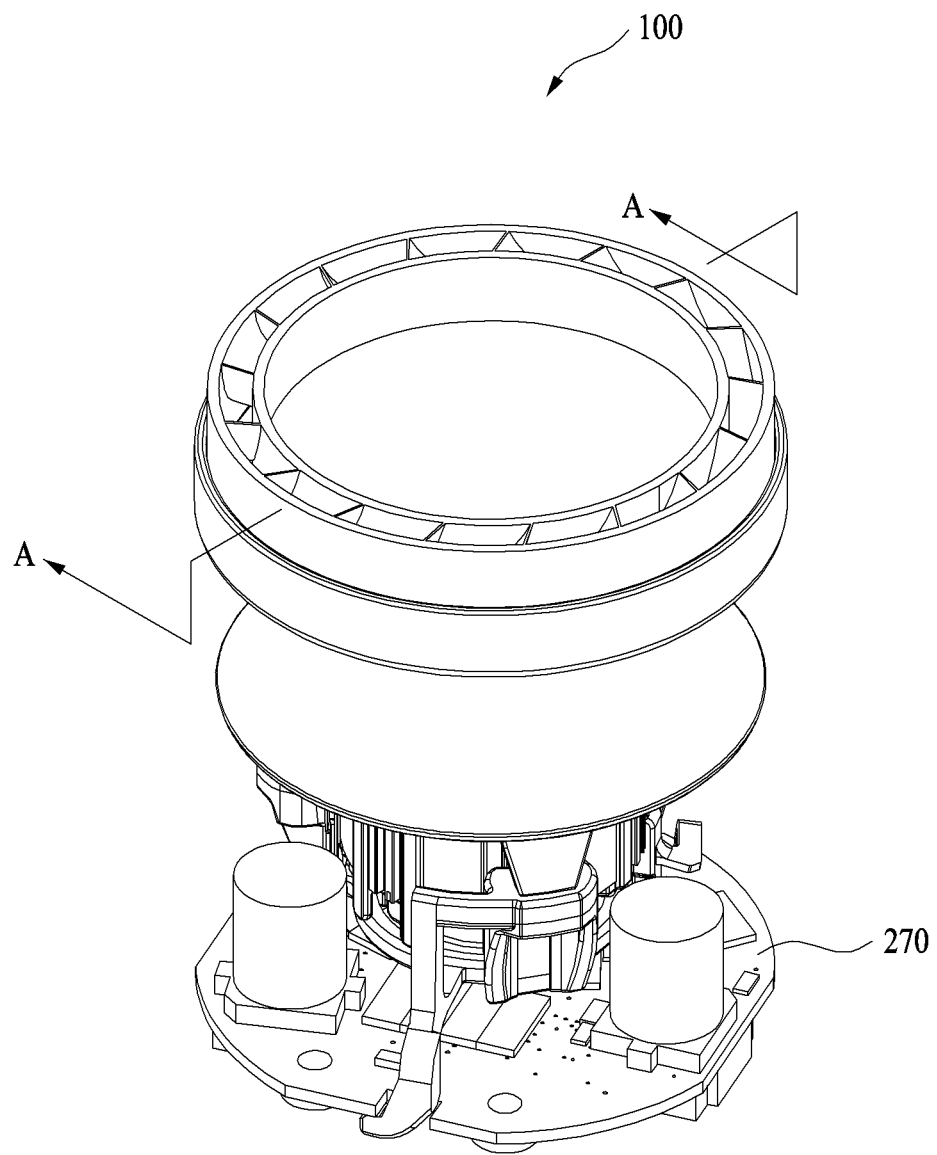
FIG. 2A is a perspective view illustrating a motor assembly according to an example embodiment.
Figure 2B:
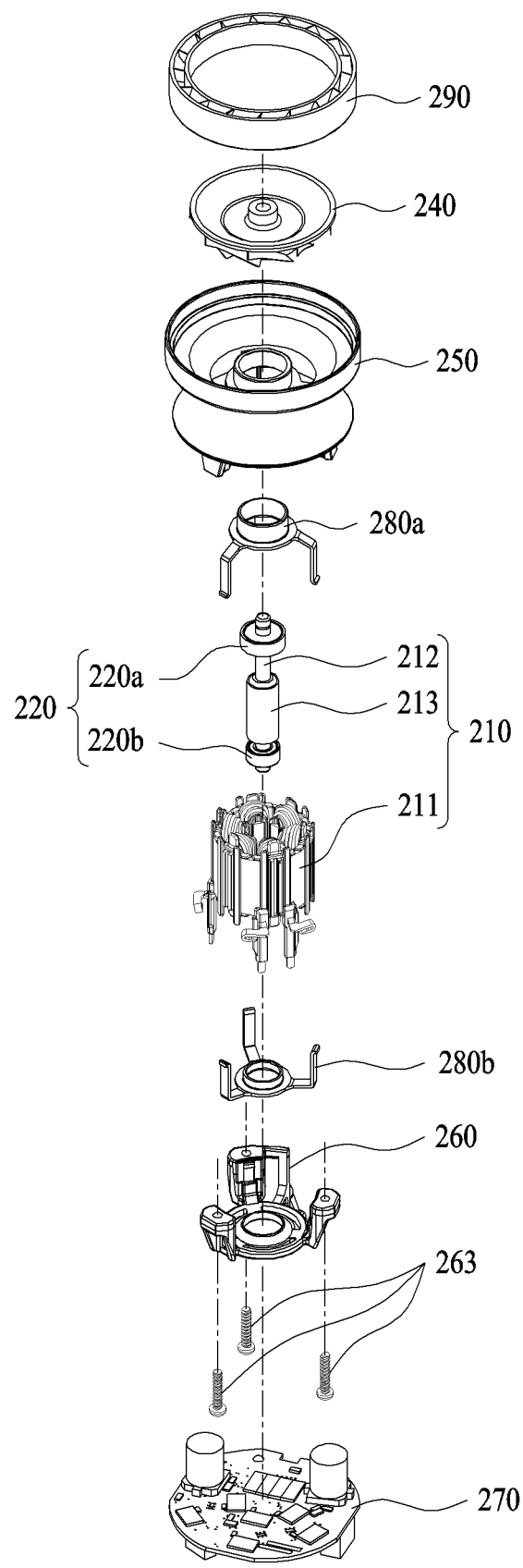
FIG. 2B is an exploded perspective view illustrating the motor assembly according to an example embodiment.
Figure 2C:
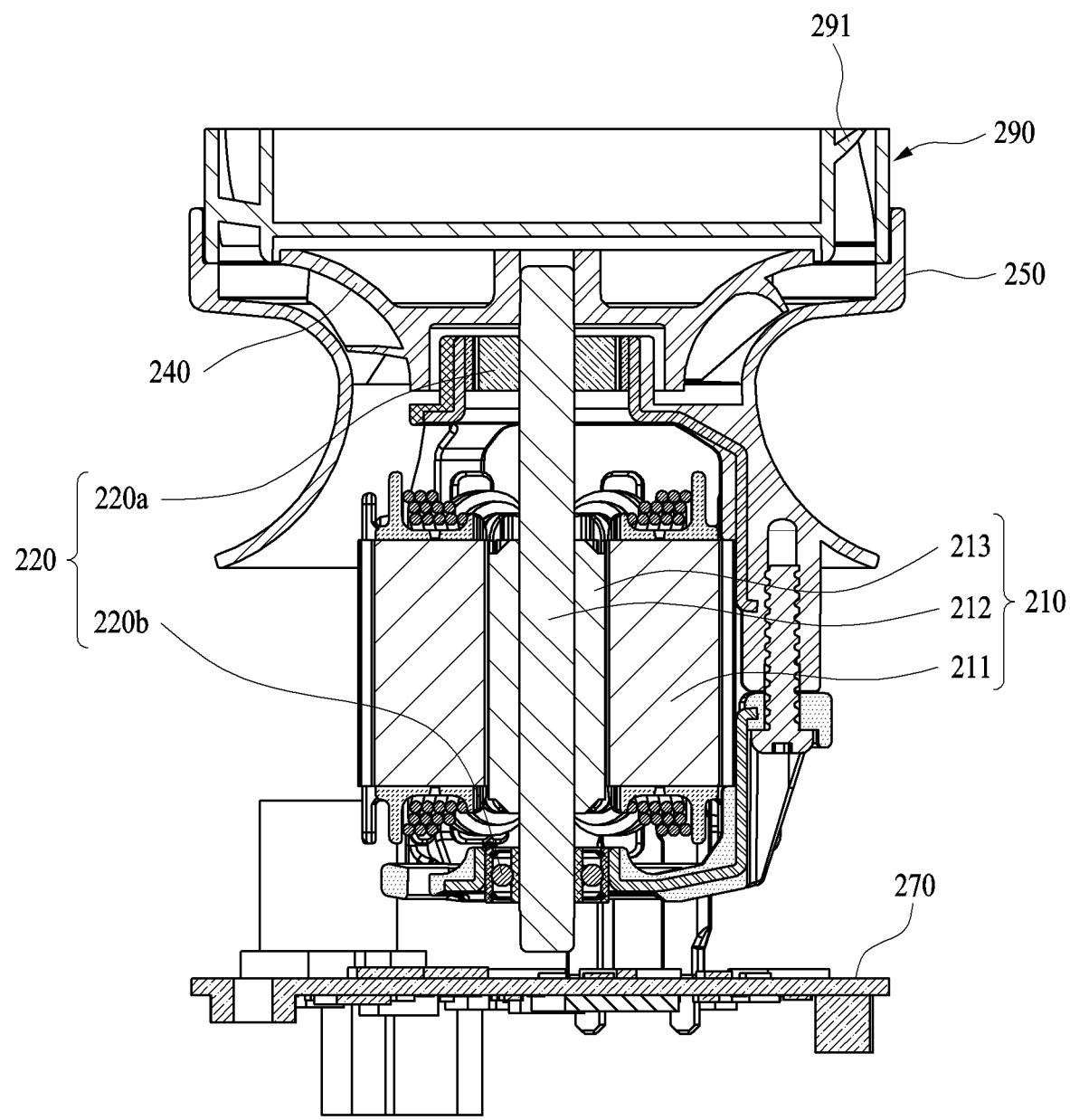
FIG. 2C is a cross-sectional view illustrating the motor assembly according to an example embodiment.

FIG. 1 is a perspective view illustrating a mechanical device according to an example embodiment, FIG. 2A is a perspective view illustrating a motor assembly according to an example embodiment, FIG. 2B is an exploded perspective view illustrating the motor assembly according to an example embodiment, and FIG. 2C is a cross-sectional view illustrating the motor assembly taken along an A-A line.

Referring to FIGS. 1, 2A, 2B, and 2C, a mechanical device 1 may include bearings 220 for supporting a rotation shaft 212 rotating at a high speed. Example embodiments of the present disclosure may provide an example of an airfoil journal bearing (e.g., an airfoil journal bearing 320 of FIG. 3A) on the rotation shaft 212 of a motor of a vacuum cleaner for ease of description. However, the foregoing example is provided merely as an example, and the airfoil journal bearing set forth herein may be applicable to any mechanical devices (e.g., the mechanical device 1) including a rotation shaft.

The mechanical device 1 may include a motor assembly 100. For example, the mechanical device 1 may be a vacuum cleaner for generating air pressure through an operation of the motor assembly 100. The vacuum cleaner may include a main body 10, a suction head 30, a wand 20, and a handle 40.

The handle 40 may be coupled to the main body 10 and may be gripped by a user such that the user may operate the vacuum cleaner (e.g., the mechanical device 1). The handle 40 may include an operator receiving operation information such that the user may control the vacuum cleaner (e.g., the mechanical device 1).

The suction head 30 may be connected to the main body 10 and may suck dust or contaminants from a surface to be cleaned through sucking force generated from the motor assembly 100 to be described below. The suction head 30 may contact the surface to be cleaned.

The wand 20 may connect the main body 10 to the suction head 30 and include a duct inside the wand 20 such that foreign materials sucked through the suction head 30 may move to the main body 10.

The main body 10 may include a dust collector 11 and a driver 12 inside the main body 10. The dust collector 11 may collect dust by separating foreign materials, such as dust or contaminants, from air sucked by the suction head 30. The driver 12 may generate power for a sucking motion of the vacuum cleaner (e.g., the mechanical device 1). The driver 12 may include the motor assembly 100 inside the driver 12, and the motor assembly 100 may generate mechanical power by receiving electric power.

The motor assembly 100 may include a motor 210, first and second motor housings 250 and 260, an impeller 240, a diffuser 290, and a substrate 270.

The motor 210 may include a stator 211, a rotor 213 rotating by electromagnetic force applied to the stator 211, and the rotation shaft 212 connected to the rotor 213. The rotation shaft 212 may rotate around an axis.

The first and second motor housings 250 and 260 may form an exterior of the motor assembly 100. The first and second motor housings 250 and 260 may be connected to each other around the rotation shaft 212. The first and second motor housings 250 and 260 may be fixed and coupled to each other through a coupling member 263.

The impeller 240 may rotate by being coupled to the rotation shaft 212. The impeller 240 may generate flow of air through a rotational motion by rotation of the rotation shaft 212. For example, the impeller 240, by being coupled to the first motor housing 250, may guide the flow of air generated by rotation to a set direction.

The diffuser 290 may be connected to the first motor housing 250 and guide the flowing air to the set direction through the impeller 240. The diffuser 290 may include a plurality of diffuser vanes formed in the outer surface of the diffuser 290 and may guide a direction of air passing the diffuser 290 through a diffuser vane 291.

One or more bearings 220 may be connected to the rotation shaft 212. The bearings 220 may fix a position of the rotation shaft 212 and rotate the rotation shaft 212 while supporting a load generated upon rotation of the rotation shaft 212. For example, the bearings 220 may include a first bearing 220a connected to a first part of the rotation shaft 212 and a second bearing 220b connected to a second part of the rotation shaft 212. The first bearing 220a may be between the rotation shaft 212 and the first motor housing 250, and the second bearing 220b may be between the rotation shaft 212 and the second motor housing 260.

The bearings 220 may be respectively connected, through first and second bearing seating portions 280a and 280b, to the first and second motor housings 250 and 260. For example, the first bearing 220a may be connected to the first bearing seating portion 280a and the second bearing 220b may be connected to the second bearing seating portion 280b. In this case, the first bearing seating portion 280a may be connected to the first motor housing 250 and the second bearing seating portion 280b may be connected to the second motor housing 260.

One of the bearings 220 supporting the rotation shaft 212 may be an airfoil journal bearing. For example, one of the first and second bearings 220a and 220b may be an airfoil journal bearing. In this case, the other may be a ball bearing. Hereinafter, for ease of description, the first bearing 220a is assumed to be an airfoil journal bearing. However, the foregoing example is provided merely as an example, and there may be other examples that the second bearing 220b may be an airfoil journal bearing or both the first and second bearings 220a and 220b may be airfoil journal bearings.

Figure 3A:
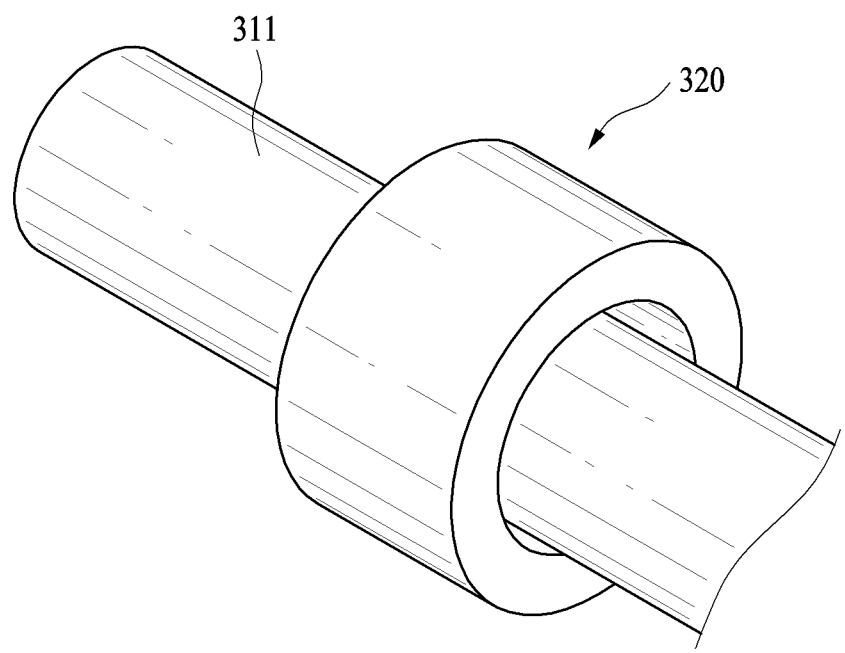
FIG. 3A is a perspective view illustrating an airfoil journal bearing supporting a rotation shaft, according to an example embodiment.
Figure 3B:
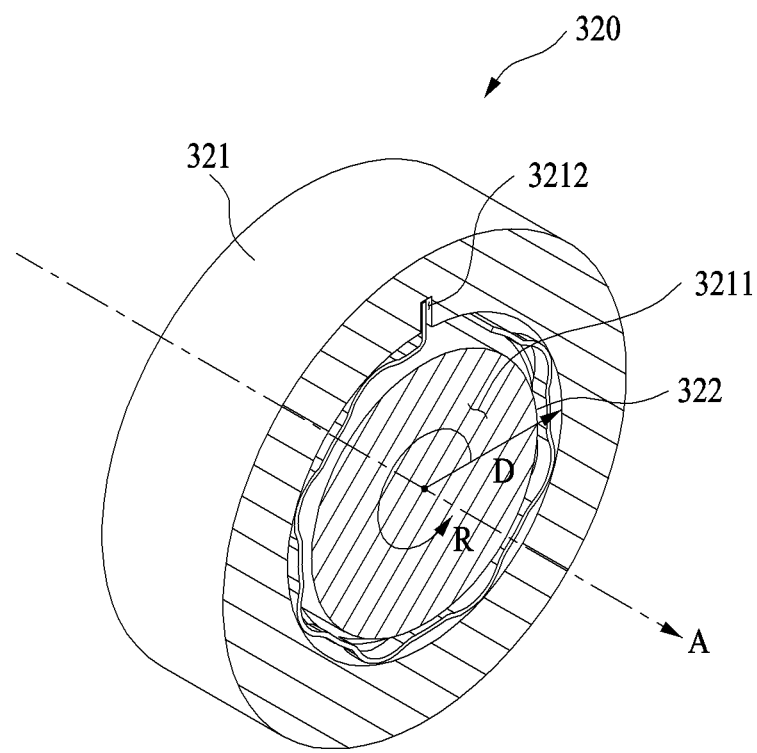
FIG. 3B is a cross-sectional perspective view illustrating an airfoil journal bearing according to an example embodiment.
Figure 4A:
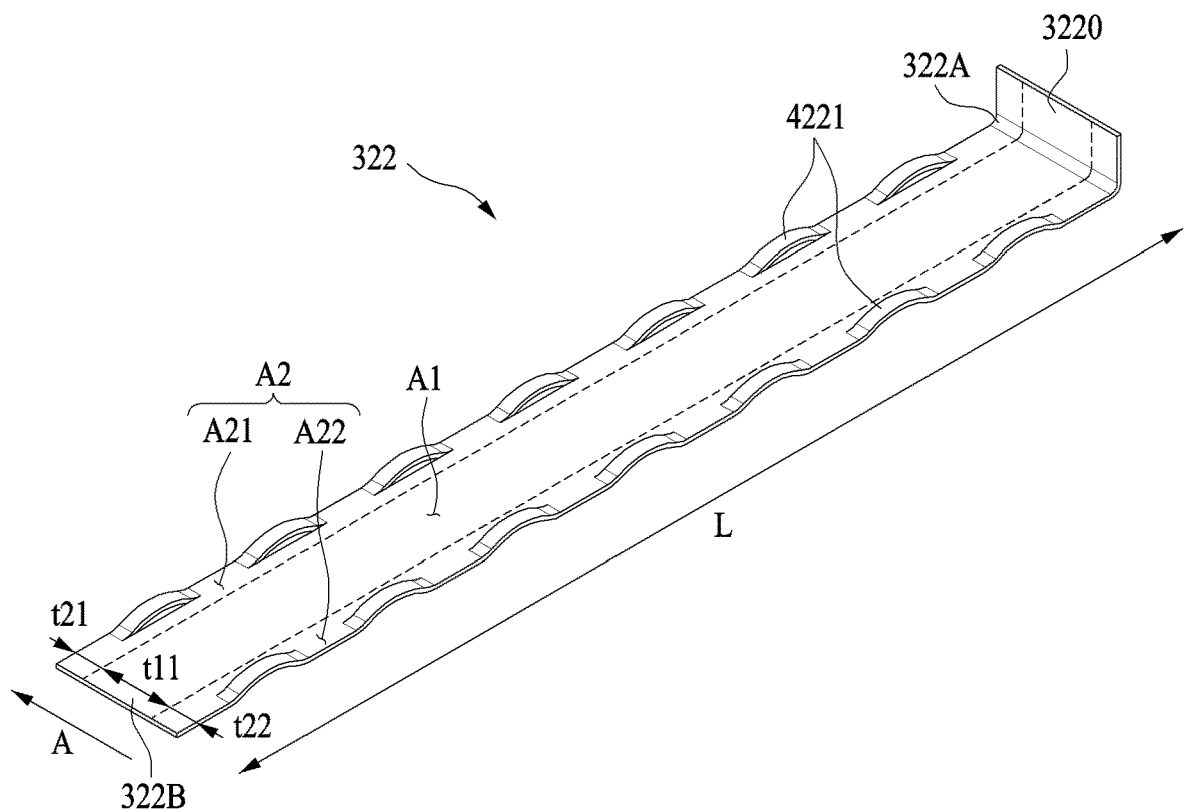
FIG. 4A is a diagram illustrating an unfolded airfoil according to an example embodiment.
Figure 4B:
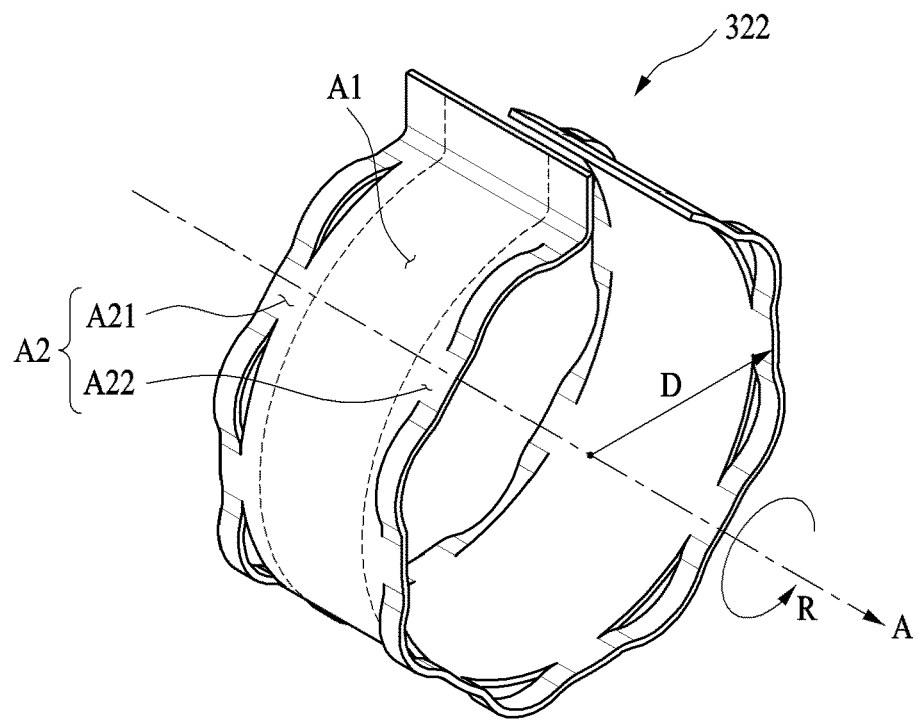
FIG. 4B is a diagram illustrating a rolled airfoil according to an example embodiment.
Figure 5A:
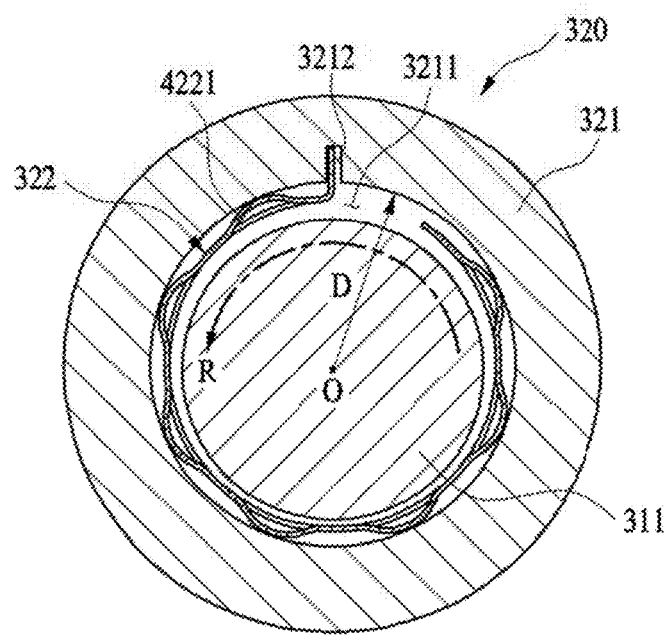
FIG. 5A is a cross-sectional view illustrating a first foil region in an airfoil journal bearing viewed from the axial direction, according to an example embodiment.
Figure 5B:
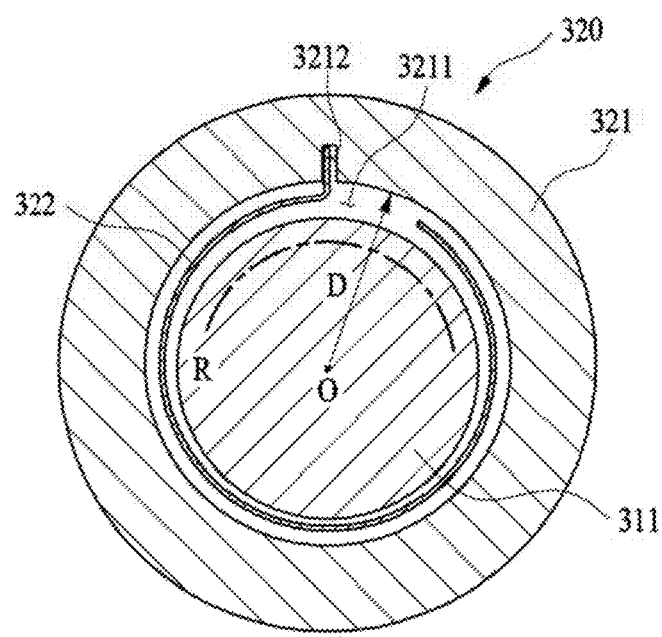
FIG. 5B is a cross-sectional view illustrating a second foil region in an airfoil journal bearing viewed from the axial direction, according to an example embodiment.

FIG. 3A is a perspective view illustrating an airfoil journal bearing supporting a rotation shaft, according to an example embodiment, FIG. 3B is a cross-sectional perspective view illustrating the airfoil journal bearing according to an example embodiment, FIG. 4A is a diagram illustrating an unfolded airfoil according to an example embodiment, FIG. 4B is a diagram illustrating a rolled airfoil according to an example embodiment, FIG. 5A is a cross-sectional view illustrating a first foil region in an airfoil journal bearing viewed from the axial direction, according to an example embodiment, and FIG. 5B is a cross-sectional view illustrating a second foil region in an airfoil journal bearing viewed from the axial direction, according to an example embodiment.

Referring to FIGS. 3A to 5B, an airfoil journal bearing 320 may rotatably support a rotation shaft 311. The airfoil journal bearing 320 may support some of the outer surface of the rotation shaft 311 and may fix the rotation shaft 311 in a predetermined position while supporting a load generated from rotation of the rotation shaft 311. The airfoil journal bearing 320 may form an air layer between itself and the outer circumferential surface of the rotation shaft 311. The airfoil journal bearing 320 may support a load in a radial direction D of the rotation shaft 311 through the pressure in the air layer while not contacting the rotation shaft 311. Hereinafter, for ease of description, the longitudinal direction of the rotation shaft 311 may be referred to as an axial direction A. Axial direction A shown in the figures may also be referred to herein as a "first" axial direction, while the direction opposite to axial direction A may be referred to as a "second" axial direction. The direction perpendicular to the axial direction A and rotating around the outer circumferential surface of the rotation shaft 311 may be referred to as a circumferential direction R. In addition, in the cross-sectional view of the rotation shaft 311, a direction from the center of the rotation shaft 311 toward the outer circumferential surface of the rotation shaft 311 may be referred to as the radial direction D. The airfoil journal bearing 320 may include a bearing housing 321 and an airfoil 322.

The bearing housing 321 may include a hollow 3211 into which the rotation shaft 311 is inserted. The hollow 3211 may be formed through the bearing housing 321 in the axial direction A of the rotation shaft 311 such that the rotation shaft 311 may be inserted through the bearing housing 321. The hollow 3211 may have a shape practically corresponding to the shape of the cross-section of the rotation shaft 311, for example, a circular shape. In this case, the diameter of the inner circumferential surface of the bearing housing 3213211 may be greater than the diameter of the outer circumferential surface of the rotation shaft 311.

Figure 7A:
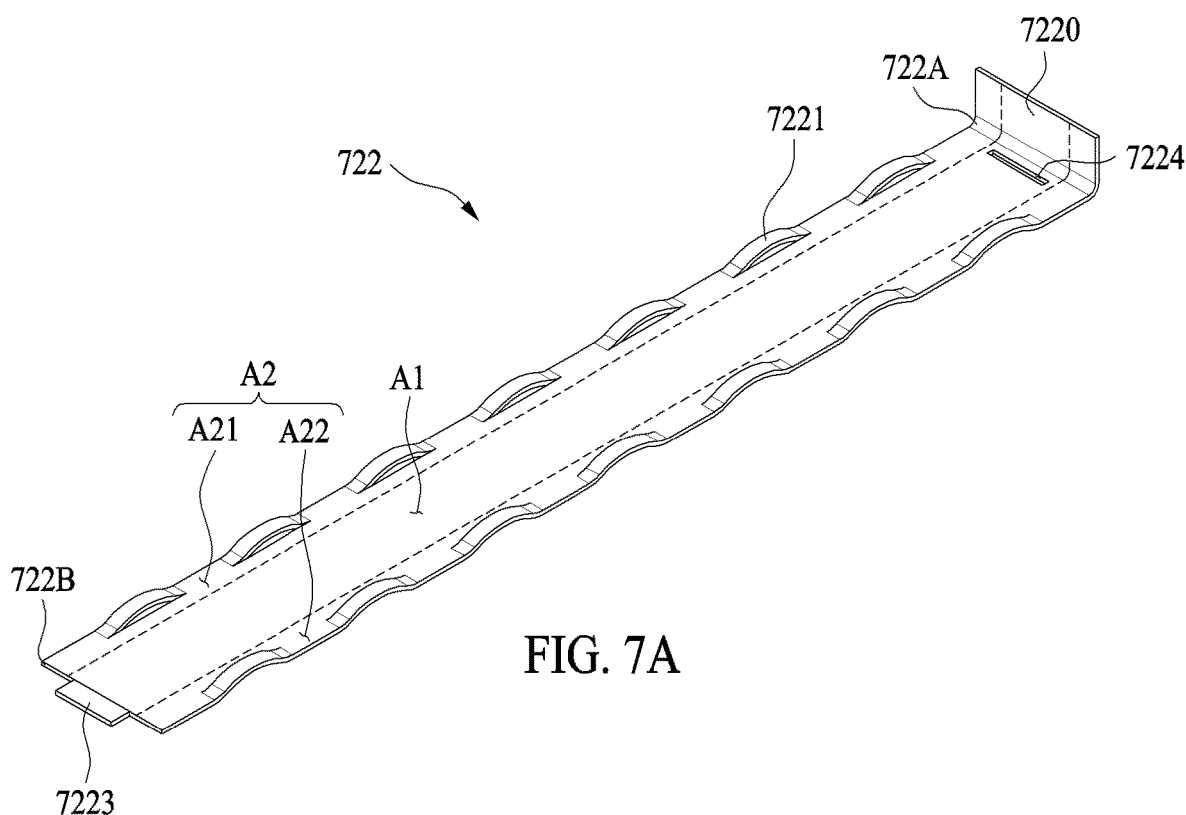
FIG. 7A is a cross-sectional view illustrating an airfoil journal bearing according to an example embodiment.

The airfoil 322 may be between the outer circumferential surface of the rotation shaft 311 and the inner circumferential surface of the bearing housing 321 forming the hollow 3211. In this case, a fluid layer, for example, a thin air layer, may be formed between the airfoil 322 and the rotation shaft 311. The airfoil 322 may be in the hollow 3211, extending along the outer surface of the rotation shaft 311 in the circumferential direction R. For example, as illustrated in FIG. 5A, on a cross-section perpendicular to the axial direction A, the airfoil 322 may enclose, in a range from 180 to 360 degrees, the outer surface of the rotation shaft 311 in the circumferential direction R. As another example, as illustrated in FIG. 7A, an airfoil 722 may extend, in the circumferential direction R, to the entire outer circumferential surface of the rotation shaft 711, for example, practically in a range of 360 degrees.

In an example embodiment, in the circumferential direction of the hollow 3211, a first airfoil edge 322A of the airfoil 322 may be connected to the bearing housing 321 as a fixed edge, and a second airfoil edge 322B, opposite to the first airfoil edge 322A, of the airfoil 322 may be formed as a free edge. In this case, an insert groove 3212 may be formed in the inner circumferential surface of the bearing housing 321, and the first airfoil edge 322A of the airfoil 322 may be inserted and fixed into the insert groove 3212. For example, the airfoil 322 may include an insert part 3220 formed at the first airfoil edge 322A and bent outwardly in the radial direction D of the hollow 3211 such that the insert part 3220 may be inserted into the insert groove 3212. In this case, the second airfoil edge 322B of the airfoil 322 may extend, in the circumferential direction R, to enclose the outer circumferential surface of the rotation shaft 311. The airfoil 322 may form a gap from the outer circumferential surface of the rotation shaft 311. The airfoil 322 may be formed integrally as one body by rolling a thin plate-shaped single member in the circumferential direction R.

The airfoil 322 may include a first foil region A1 and a pair of second foil regions A2 respectively at edges of the first foil region A1. The first foil region A1 and the second foil regions A2 may support, in the axial direction A, different parts of the outer surface of the rotation shaft 311 in the hollow 3211. The first foil region A1 and the second foil regions A2 may have practically the same extending length in the circumferential direction R.

The first foil region A1 may receive pressure generated by rotation of the rotation shaft 311. The first foil region A1 may maintain a gap from the outer circumferential surface of the rotation shaft 311 through an air layer formed between the first foil region A1 and the outer circumferential surface of the rotation shaft 311. The first foil region A1 may have a smooth curve surface to receive pressure of an air layer upon rotation of the rotation shaft 311. A coating layer including a polytetrafluoroethylene (PTFE) material may be formed on the inner surface of the first foil region A1 facing the outer surface of the rotation shaft 311. The coating layer may decrease friction upon the rotation shaft 311 contacting the first foil region A1 during rotation of the rotation shaft 311. The first foil region A1 may maintain a gap, during rotation of the rotation shaft 311, from the outer surface of the rotation shaft 311 through air pressure, and accordingly, the rotation shaft 311 may smoothly rotate.

A pair of second foil regions A21 and A22 (collectively referred to as A2) may extend from the edges of the first foil region A1 such that second foil region A21 extends in a first axial direction A while second foil region A22 extends in a second axial direction being opposite to the first axial direction A, as shown in FIGS. 4A-4B. The pair of second foil regions A21 and A22 may have a plurality of elastic bumps 4221 convexly protruding in a longitudinal direction (e.g., the circumferential direction R of FIG. 4B). The elastic bumps 4221 in the second foil regions A2 may be transformed to apply elastic force upon rotation of the rotation shaft 311. When the airfoil 322 is rolled and in the hollow 3211 as illustrated in FIG. 5B, the elastic bumps 4221 in the second foil regions A2 may have a shape protruding from the outer circumferential surface of the rotation shaft 311 toward the inner circumferential surface of the bearing housing 321. In this case, the elastic bumps 4221 may be formed by cutting off at least some of the second foil regions A2. For example, as illustrated in FIG. 4A, the elastic bumps 4221 may be formed by cutting off parts of the second foil regions A2 in the circumferential direction R and pressing the cutoff parts to have a relatively larger curvature than the other regions A2. However, the foregoing example is merely an example of forming the elastic bumps 4221, and various forms of the elastic bumps 4221 having elastic force may be formed in the second foil regions A2 by many known methods.

The elastic bumps 4221 spaced apart from one another with regular gaps may be formed in the circumferential direction of the second foil regions A2. However, the foregoing example is merely an example for ease of description, gaps between the elastic bumps 4221 may vary depending on design conditions. For example, the airfoil 322, to adjust a damping effect by the elastic bumps 4221, based on design conditions, may include some relatively large distances between the elastic bumps 4221. In addition, although forming one elastic bump 4221, in the axial direction A of the airfoil 322, in the second foil regions A2 is illustrated as the examples in the drawings, there may be an example of forming a plurality of elastic bumps 4221, in the axial direction A of the airfoil 322, in the second foil region A2.

In the axial direction A of the rotation shaft 311, the first foil region A1 may be between the pair of second foil regions A21 and A22. In this case, based on widths parallel to the axial direction A, a width t11 of the first foil region A1 may be greater than each of widths t21 and t22 of the second foil regions A21 and A22. The airfoil 322 may receive a load in the radial direction D upon rotation of the rotation shaft 311 through the first foil region A1 and may maintain a gap from the outer circumferential surface of the rotation shaft 311 through an elastic function based on the load in the radial direction D through the second foil regions A2. For example, on a cross-section perpendicular to the rotation shaft 311, when a relatively heavy load is applied to a certain region of the airfoil 322, the first foil region A1 corresponding to the certain region of the airfoil 322 may receive a load from a compressed air layer and transmit the load to the second foil regions A2 connected to both edges of the first foil region A1. The load transmitted to the second foil regions A2 may cause the elastic bumps 4221 to spring. In this case, the airfoil region corresponding to the certain region to which the load is applied may move in a direction away from the rotation shaft 311 upon compression of the elastic bumps 4221, in other words, in a direction to the inner circumferential surface of the bearing housing 321. Thereafter, when the load in the radial direction D, which has been applied to the certain region, decreases, the elastic bumps 4221 may restore their forms through stored elasticity and return the certain region to its original position in a direction to the center of the hollow 3211. In other words, the airfoil 322, through the springing of the elastic bumps 4221, may support rotation of the rotation shaft 311 while maintaining a gap from the outer circumferential surface of the rotation shaft 311.

The first foil region A1 and the pair of second foil regions A2 may be integrally formed as one body. For example, the airfoil 322 may form the elastic bumps 4221 in the second foil regions A2 by processing a plate-shaped single member, and then, may be formed integrally as one body by rolling the processed plate-shaped single member in the circumferential direction R. Accordingly, the first foil region A1 and the second foil regions A2 may be formed in a single member, in which the first foil region A1 receives a load in the radial direction D from the rotation shaft 311 and the second foil regions A2 performs an elastic function based on the load. Therefore, the first foil region A1 and the second foil regions A2 may not need a separate assembly process for connection and may be easily included in the bearing housing 321. A bump foil and a top foil usually are separately manufactured and stacked so as to be inserted into a bearing housing. Different from such a conventional structure, the first foil region A1 and the second foil regions A2 of the airfoil 322 may not be stacked and may be formed parallel to the axial direction A of the rotation shaft 311. Therefore, the thickness of the airfoil 322 may be minimized in the radial direction D and accordingly, the airfoil journal bearing 320 may be miniaturized.

Figure 6A:
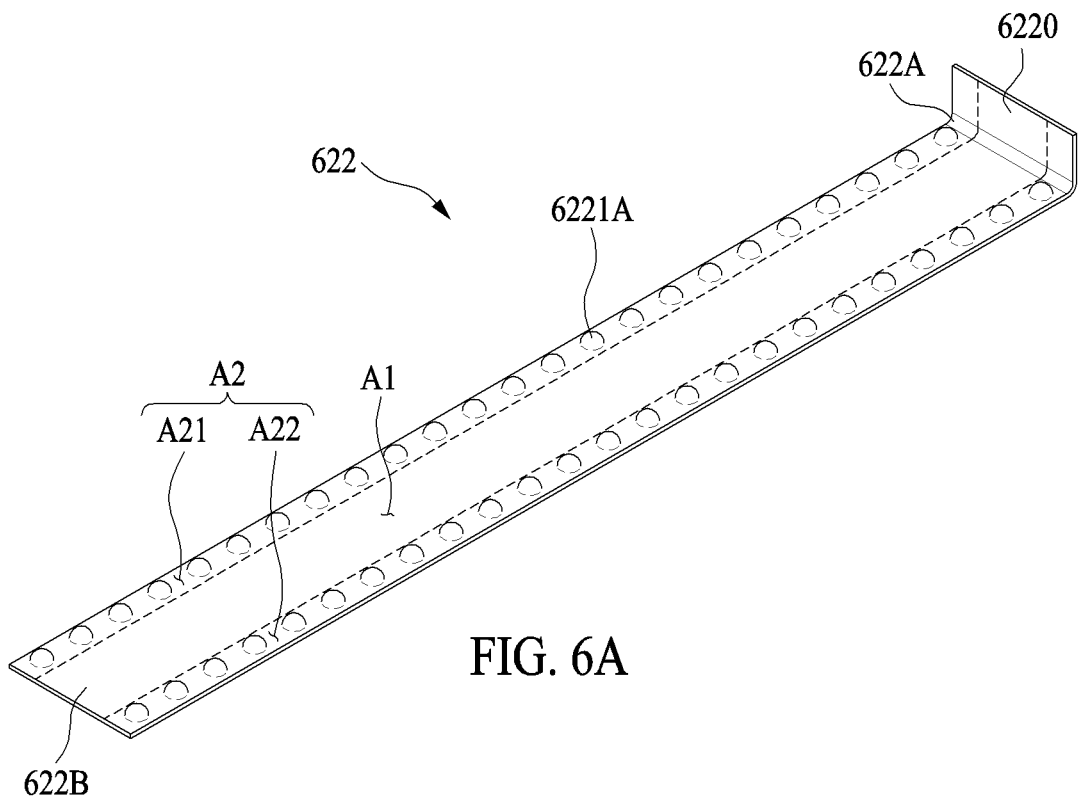
FIG. 6A is a diagram illustrating an unfolded airfoil according to an example embodiment.
Figure 6B:
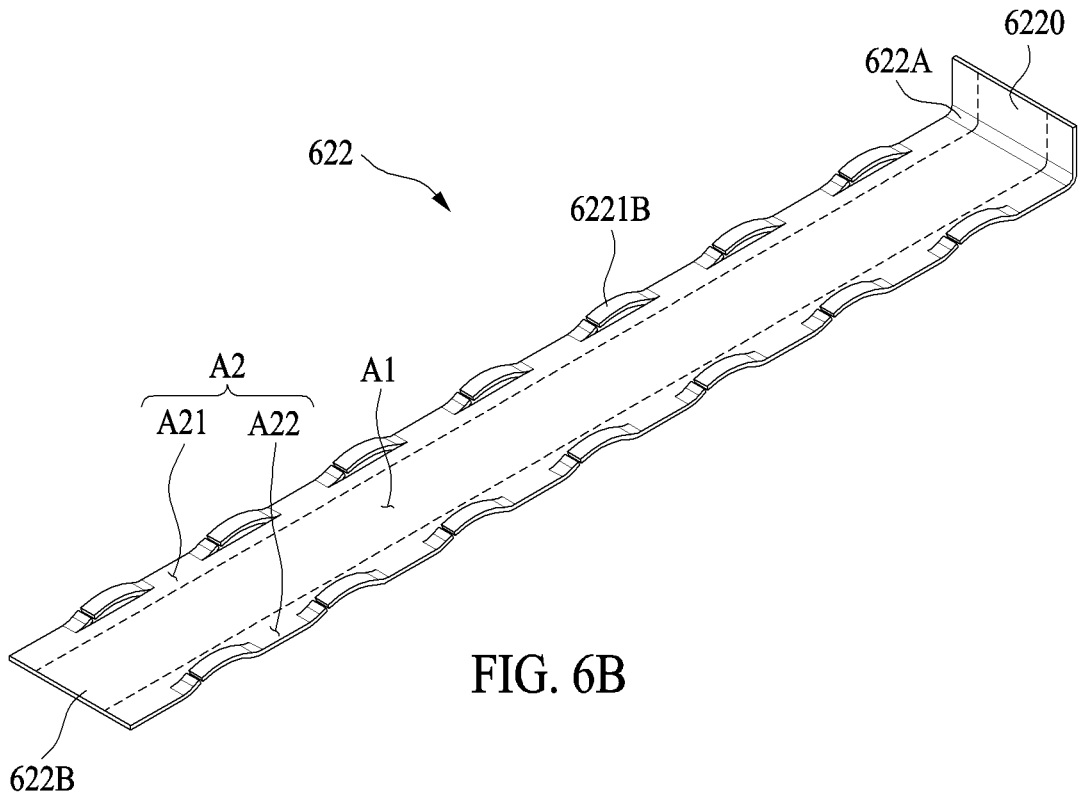
FIG. 6B is a diagram illustrating an unfolded airfoil according to another example embodiment.

FIG. 6A is a diagram illustrating an unfolded airfoil according to an example embodiment, and FIG. 6B is a diagram illustrating an unfolded airfoil according to another example embodiment.

Referring to FIGS. 6A and 6B, an airfoil 622 may include various forms of elastic bumps 6221A and 6221B.

The airfoil 622 may include a first airfoil edge 622A and a second airfoil edge 622B opposite to the first airfoil edge 622A. In this case, the first airfoil edge 622A may be fixed to a bearing housing (e.g., the bearing housing 321320 of FIG. 3B). For example, the first airfoil edge 622A may include an insert part 6220 bent to be inserted and fixed into an insert groove (e.g., the insert groove 3212 of FIG. 3B) formed in an inner surface of the bearing housing.

The airfoil 622 may include a first foil region A1 and a pair of second foil regions A2 respectively at edges of the first foil region A1 in its width direction. Each of the pair of second foil regions A2 may include a plurality of elastic bumps 6221A and 6221B for performing an elastic function, based on a load in a radial direction upon rotation of a rotation shaft (e.g., the rotation shaft 311 of FIG. 3A). The plurality of elastic bumps 6221A and 6221B may protrude in one direction. In this case, the plurality of elastic bumps 6221A and 6221B may be inserted into the bearing housing, as described with reference to FIG. 4B, and may be in the circumferential direction R to enclose the outer circumferential surface of the rotation shaft 311.

The elastic bump 6221A, as illustrated in FIG. 6A, may be formed by embossing at least some of the second foil regions A2. In this case, the second foil region A2 with the elastic bump 6221A may have an increased surface area because of embossing, and thus, may have a relatively thin thickness compared to the other regions A2 without the elastic bump 6221A. Accordingly, the elastic bump 6221A may perform an elastic function by transforming its form based on external force applied thereto in the thickness direction of the elastic bump 6221A.

The elastic bump 6221B, as illustrated in FIG. 6B, may be formed by cutting off some of the second foil regions A2. For example, the elastic bump 6221B may be formed by cutting off a width-direction edge of the second foil regions A2 in a longitudinal direction, and a cutoff part may be pressed to have a relatively high curvature than the other regions A2. In this case, a protruding elastic bump (e.g., the elastic bump 6221B) may adjust stiffness upon springing through partial cutoff in its width direction.

Figure 7B:
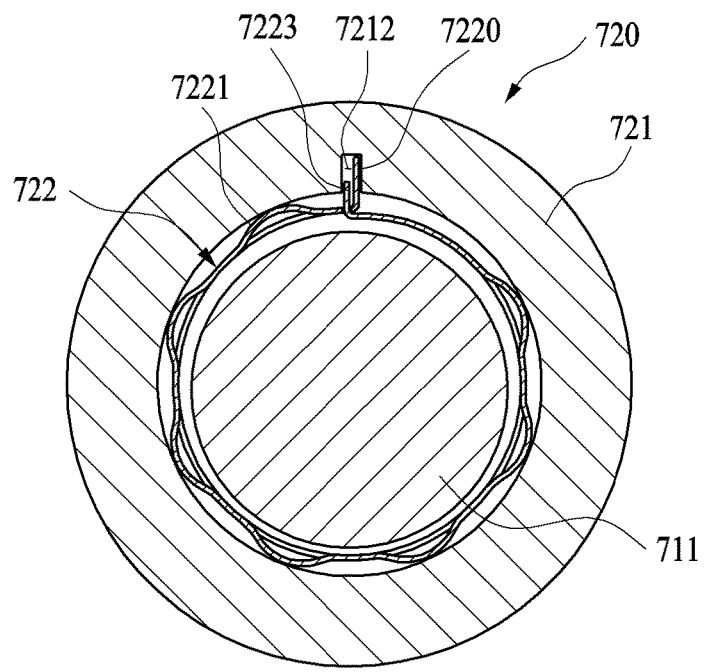
FIG. 7B is a diagram illustrating an unfolded airfoil according to another example embodiment.

FIG. 7A is a cross-sectional view illustrating an airfoil journal bearing according to an example embodiment, and FIG. 7B is a diagram illustrating an unfolded airfoil according to another example embodiment.

Referring to FIGS. 7A and 7B, an airfoil journal bearing 720 may include a bearing housing 721 and an airfoil 722. The pair of second foil regions A21 and A22 may have a plurality of elastic bumps 7221 convexly protruding in a longitudinal direction.

The bearing housing 721 may include a hollow 7211 through which a rotation shaft 711 is inserted. The bearing housing 721 may be in the inner circumferential surface of the bearing housing 721 forming the hollow 7211 and may include an insert groove 7212 into which the airfoil 722 may be inserted and fixed.

The airfoil 722 may be in the hollow 72117212 and between the bearing housing 721 and the rotation shaft 711. The airfoil 722, on a cross-section, perpendicular to the axial direction, of the rotation shaft 711, may enclose the entire outer surface of the rotation shaft 711 in the circumferential direction R. For example, as illustrated in FIG. 7A, the airfoil 722 may be in the hollow 7211 by enclosing the outer surface of the rotation shaft 711 one round. In this case, the airfoil 722, on the cross-section perpendicular to the axial direction, may have both edges of the airfoil 722 fixed in the hollow 7211. For example, the airfoil 722 may include a first insert part 7220 and a second insert part 7223, in which the first insert part 7220 extends from a first airfoil edge 722A and bent to be inserted into the insert groove 7212, and the second insert part 7223 extends from the second airfoil edge 722B and inserted into the insert groove 7212. The airfoil 722 may be rolled and enclose the outer surface of the rotation shaft 711 one round with the first insert part 7220 inserted into the insert groove 7212, as illustrated in FIG. 7A. In this case, in the radial direction of the hollow 7211, in a part, overlapping the insert groove 7212, of the airfoil 722, a through hole 7224 may be formed such that the second insert part 7223 at the second airfoil edge 722B may pass, in the radial direction of the hollow 7211, through the through hole 7224 and may be inserted into the insert groove 7212. Accordingly, the second insert part 7223 may be inserted into the insert groove 7212 by passing through the through hole 7224. As such, the airfoil 722 may be securely included in the hollow 7211.

Figure 8A:
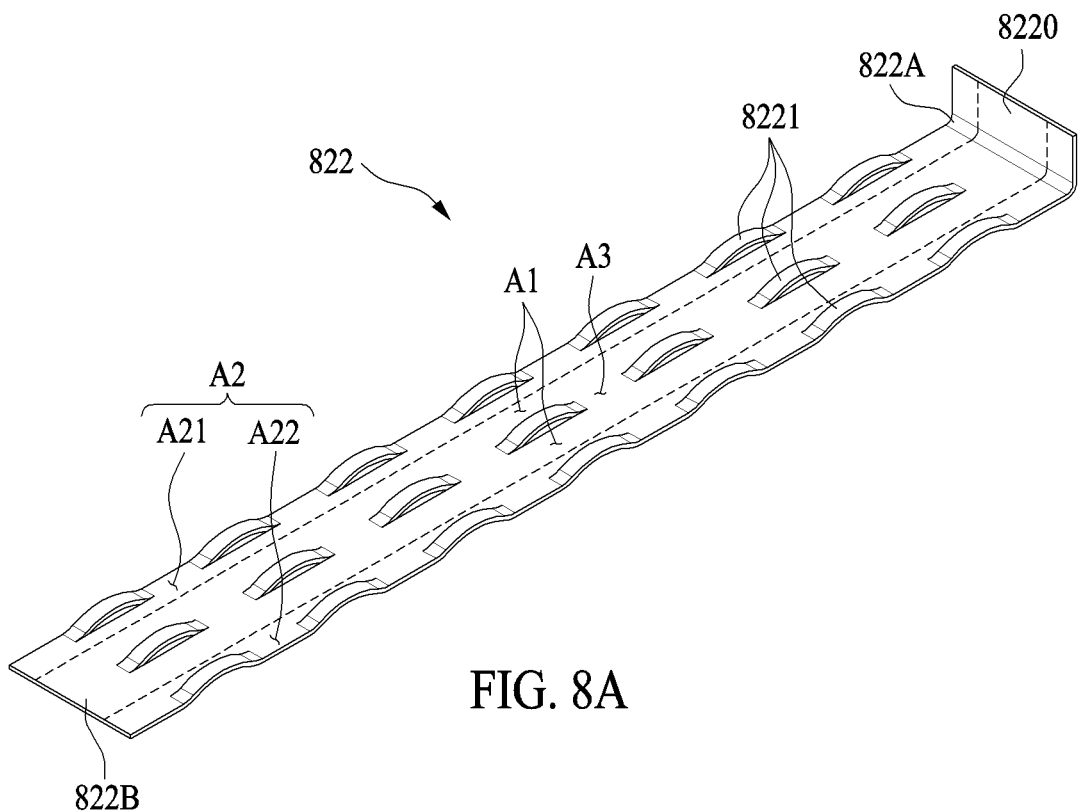
FIG. 8A is a diagram illustrating an unfolded airfoil according to another example embodiment.
Figure 8B:
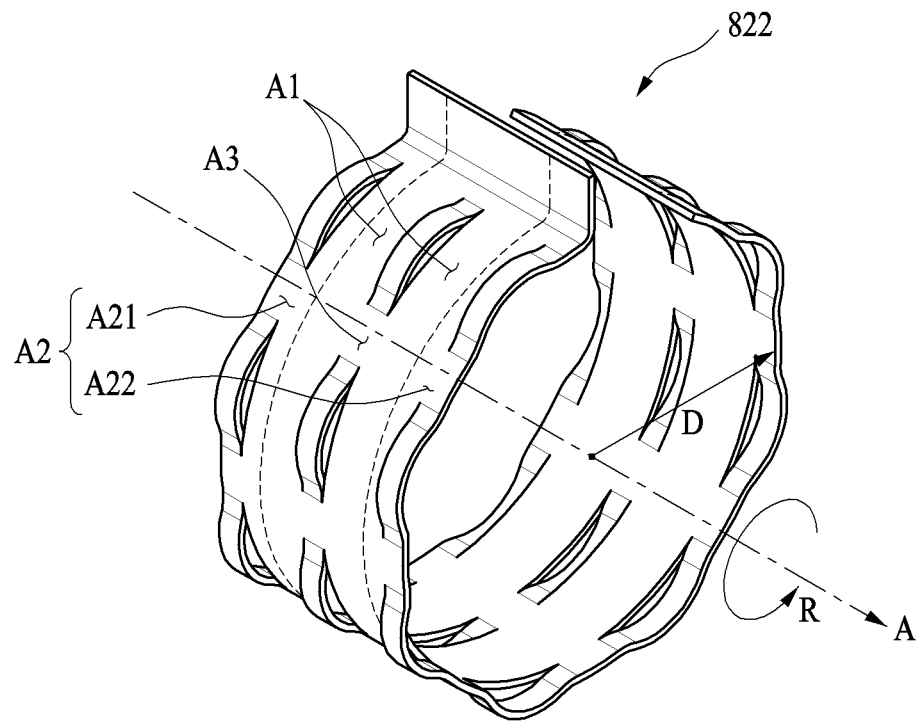
FIG. 8B is a diagram illustrating a rolled airfoil according to another example embodiment.

FIG. 8A is a diagram illustrating an unfolded airfoil according to another example embodiment, and FIG. 8B is a diagram illustrating a rolled airfoil according to another example embodiment.

Referring to FIGS. 8A and 8B, an airfoil 822 may include a first foil region A1, a pair of second foil regions A2, and a third foil region A3. The airfoil 822 may include an insert part 8220 formed at the first airfoil edge 822A and bent outwardly in the radial direction D when inserted into the bearing housing, and the second airfoil edge 822B of the airfoil 822 may extend, in the circumferential direction R, to enclose the outer circumferential surface of the rotation shaft.

The second foil regions A21 and A22 (collectively referred to as A2) may each be at an edge in the width direction perpendicular to the longitudinal direction of the airfoil 822. When the airfoil 822 is in the hollow 3211 of the bearing housing 321 as illustrated in FIG. 3B, the pair of second foil regions A21 and A22 may be both edges in the axial direction of the first foil region A1. The second foil regions A2 may include a plurality of elastic bumps 8221 formed in the longitudinal direction of the second foil regions A2 and performing an elastic function.

The third foil region A3 may be formed apart from and between the pair of second foil regions A2. In this case, the third foil region A3 may be formed across the first foil region A1 in the longitudinal direction of the first foil region A1. The third foil region A3 may include the plurality of elastic bumps 8221 formed in the longitudinal direction of the third foil region A3. Although the elastic bumps in the third foil region A3 are illustrated as having the same form as the elastic bumps in the second foil regions A2 in the drawings, the example is for ease of description. The forms and arrangement of the elastic bumps in the third foil region A3 may vary depending on design conditions of an airfoil.

The third foil region A3 may assist an elastic function based on a load, which is applied to the airfoil 822 in the radial direction. The airfoil 822 may receive a load, in the radial direction_(e.g., radial direction D of FIG. 4b), upon rotation of a rotation shaft, from the first foil region A1 and may perform damping and elastic functions through the second foil regions A2. Accordingly, the airfoil 822 may support rotation of the rotation shaft while maintaining a gap from the rotation shaft.

According to an example embodiment, an airfoil journal bearing 320 may include a bearing housing 321 having an inner circumferential surface forming a hollow 3211 through which a rotation shaft 311 is insertable, and an airfoil 322 that, when the rotation shaft 311 is inserted through the hollow 3211, is between the inner circumferential surface of the bearing housing 321 and an outer circumferential surface of the rotation shaft 321. The airfoil 322 may include a first foil region A1 that, when the rotation shaft 321 is inserted through the hollow 3211, extends in a circumferential direction R of the rotation shaft 321 in a range from 180 to 360 degrees around the rotation shaft 311, the first foil region A1 having a first airfoil edge 322A in a first axial direction A of the rotation shaft 321 and a second airfoil edge 322B in a second axial direction of the rotation shaft that is opposite to the first axial direction A. A pair of second foil regions A2 that, when the rotation shaft 311 is inserted through the hollow 3211, extend in in the circumferential direction R in a range from 180 to 360 degrees around the rotation shaft 311, each second foil region A2 comprising a plurality of elastic bumps 4221 in the circumferential direction R of the rotation shaft 321 on a surface of the respective second foil region A2. A first of the second foil region A21 of the pair of second foil regions extends from the first airfoil edge 322A of the first foil region A1 and a second of the second foil region A22 of the pair of second foil regions A2 extends from the second airfoil edge 322B of the first foil region A1. The first foil region A1, the second foil regions A2, and the plurality of elastic bumps 4221 of each second foil region A2 are integrally formed together as one body.

According to an example embodiment, the first foil region A1 has a smooth curved surface.

According to an example embodiment, each of the elastic bumps 4221 of the plurality of elastic bumps of each second foil region A2 has a protruding shape that, when the rotation shaft 311 is inserted through the hollow 3211, extends from the outer circumferential surface of the rotation shaft 311 toward the inner circumferential surface of the bearing housing 321.

According to an example embodiment, each of the elastic bumps 4221 of the plurality of elastic bumps of each second foil region A2 is formed by cutting at least some of the surface of the respective second foil region A21 and A22.

According to an example embodiment, each of the elastic bumps 4221 of the plurality of elastic bumps of each second foil region A2 is formed by embossing a part of the respective second foil region A2.

According to an example embodiment, the plurality of elastic bumps 4221 of each second foil region A2 are formed by pressing the surface of the respective second foil region A2 in certain areas while not pressing the surface in other areas such that in each respective second foil region A21 and A22, the pressed areas of the surface have a greater curvature than the other areas of the surface.

According to an example embodiment, the first foil region A1 has a first width t11 parallel to the axial direction of the rotation shaft A, the pair of second foil regions A21 and A22 have a second width t21 and a third width t22, respectively, the second width and the third width each being parallel to the axial direction of the rotation shaft, and the first width t11 is greater than each of the second width t21 and the third width t22.

According to an example embodiment, the airfoil 322 has a first airfoil edge 322A extending along the circumferential direction of the airfoil 322, the first airfoil edge 322A connected to the bearing housing 321 as a fixed edge, and the airfoil 322 has a second airfoil edge 322B opposite to the first airfoil edge 322A, the second airfoil edge 322B being a free edge.

According to an example embodiment, the bearing housing 321 includes an insert groove 3212 in the inner circumferential surface of the bearing housing 321, and the airfoil 322 includes, at the first airfoil edge 322A, a first insert part first 3220 that extends outwardly from the airfoil 322 toward the inner circumferential surface of the bearing housing 321 and is inserted into the insert groove 3212.

According to an example embodiment, when the rotation shaft 711 is inserted through the hollow 7211, the airfoil 722 encloses, at least once, the outer circumferential surface of the rotation shaft 721, and the airfoil 722 includes, at the second airfoil edge 722B, a second insert part 7223 that is inserted into the insert groove 72127224 through a hole in or near the first insert part 7220.

According to an example embodiment, the first foil region A1 and the second foil regions A21 and A22 each have a length L in the circumferential direction R of the rotation shaft, wherein the respective lengths are substantially the same for the first foil region A1 and the second foil regions A21 and A22.

According to an example embodiment, when the rotation shaft 311 is inserted through the hollow 3211, the first foil region A1 and the pair of second foil regions A21 and A22 extend at least 360 degrees around the outer circumferential surface of rotation shaft 311.

According to an example embodiment, the airfoil further includes a coating layer comprising a polytetrafluoroethylene (PTFE) material coated on an inner surface of the first foil region A1 facing the outer circumferential surface of the rotation shaft 311.

According to an example embodiment, the first foil region A1 includes a third foil region A3 having a plurality of elastic bumps 8221 that, when the rotation shaft 311 is inserted through the hollow 3211, extend in the circumferential direction R of the rotation shaft 311.

According to an example embodiment, an airfoil journal bearing 320 may include a bearing housing 321 having an inner circumferential surface forming a hollow 3211 through which a rotation shaft 311 is insertable, and when the rotation shaft 311 is inserted through hollow 3211, a gap is formed between the inner circumferential surface of the bearing housing 321 and an outer circumferential surface of the rotation shaft 311, and an airfoil 322 that, when the rotation shaft 311 is insert through the hollow 3211, is in the gap, the airfoil 322 having a first airfoil edge 322A fixed to the bearing housing 321 and a second airfoil edge 322B, opposite to the first foil edge 322A, either fixed to the bearing housing 321 or free. The airfoil includes a first foil region A1 that, when the rotation shaft 311 is inserted through the hollow 3211, is configured to receive pressure generated by rotation of the rotation shaft 311, wherein the first foil region A1 extends in a circumferential direction of the rotation shaft 311 in a range from 180 to 360 degrees around the rotation shaft 311, the first foil region A1 having a first edge in a first axial direction A of the rotation shaft 311 and a second edge in a second axial direction of the rotation shaft 311 that is opposite to the first axial direction A, and a pair of second foil regions A21 and A22 that, when the rotation shaft 311 is inserted through the hollow 3211, extend in in the circumferential direction R in a range from 180 to 360 degrees around the rotation shaft 311, each second foil region A21 and A22 comprising a plurality of elastic bumps 4221 in the circumferential direction R of the rotation shaft 311 on a surface of the respective second foil region A2 and elastically operating by pressure upon the rotation of the rotation shaft 311. A first of the second foil regions A21 of the pair of second foil regions A2 extends from the first edge of the first foil region A1 and a second of the second foil regions A22 of the pair of second foil regions A2 extends from the second edge of the first foil region A1. The airfoil 322 is formed from a single member.

According to an example embodiment, the first foil region A1 has a smooth curved surface.

According to an example embodiment, the bearing housing 321 includes an insert groove 3212 in the inner circumferential surface of the bearing housing 321, and the airfoil 322 includes an insert part 3220 configured to be inserted into the insert groove 3212, the insert part 3220 formed at the first airfoil edge 322A of the airfoil 322 and extending toward the inner circumferential surface of the bearing housing 321 for insertion thereto.

According to an example embodiment, the airfoil 322 is formed from a single member by processing the single member to form the plurality of elastic bumps 4221 in each second foil region A2, and rolling the processed single member in a circumferential direction R.

According to an example embodiment, each of the elastic bumps 4221 of the plurality of elastic bumps of each second foil region A2 has a protruding shape that, when the rotation shaft 311 is inserted through the hollow 3211, extends from the outer circumferential surface of the rotation shaft 311 toward the inner circumferential surface of the bearing housing 321.

According to an example embodiment, a mechanical device 1 includes a housing 250 and 260, a motor 210 inside the housing 250 and 260 and including a rotation shaft 311 extending in the axial direction A, an impeller 240 coupled to the rotation shaft 311 and configured to rotate by operation of the motor 210, and an airfoil journal bearing 320 for rotatably supporting the rotation shaft 311. The airfoil journal bearing includes a bearing housing 321 having an inner circumferential surface forming a hollow 3211 through which the rotation shaft 311 is inserted, and an airfoil 322 in the hollow 3211, forming, when the rotation shaft 311 is rotating, an air layer between the airfoil 322 and an outer circumferential surface of the rotation shaft 311, and extending along the inner circumferential surface of the bearing housing 311. The airfoil includes a first foil region A1 having a smooth curved surface, and a pair of second foil regions A21 and A22 respectively at edges of the first foil region A1 and including a plurality of elastic bumps 4221 along a circumference of the airfoil 322 and configured to generate elastic force upon the rotation of the rotation shaft 311. The first foil region A1 and the second foil regions A2 are integrally formed.

What is claimed is:

1. An airfoil journal bearing comprising:
   a bearing housing having an inner circumferential surface forming a hollow through which a rotation shaft is insertable; and
   an airfoil that, when the rotation shaft is inserted through the hollow, is between the inner circumferential surface of the bearing housing and an outer circumferential surface of the rotation shaft,
   wherein the airfoil comprises:
      a first foil region that, when the rotation shaft is inserted through the hollow, extends in a circumferential direction of the rotation shaft in a range from 180 to 360 degrees around the rotation shaft, the first foil region having a first edge in a first axial direction of the rotation shaft and a second edge in a second axial direction of the rotation shaft that is opposite to the first axial direction,
      a pair of second foil regions that, when the rotation shaft is inserted through the hollow, extend in in the circumferential direction in a range from 180 to 360 degrees around the rotation shaft, each second foil region comprising a plurality of elastic bumps in the circumferential direction of the rotation shaft on a surface of the respective second foil region, wherein a first of the second foil regions of the pair of second foil regions extends from the first edge of the first foil region and a second of the second foil regions of the pair of second foil regions extends from the second edge of the first foil region, wherein the first foil region has a smooth curved surface between the first edge and the second edge that is wider in the first axial direction than each of the pair of second foil regions, and wherein the first foil region, the second foil regions, and the plurality of elastic bumps of each second foil region are integrally formed together as one body.

2. The airfoil journal bearing of claim 1, wherein, each of the elastic bumps of the plurality of elastic bumps of each second foil region has a protruding shape that, when the rotation shaft is inserted through the hollow, extends from the outer circumferential surface of the rotation shaft toward the inner circumferential surface of the bearing housing.

3. The airfoil journal bearing of claim 2, wherein each of the elastic bumps of the plurality of elastic bumps of each second foil region is formed by cutting at least some of the surface of the respective second foil region.

4. The airfoil journal bearing of claim 2, wherein each of the elastic bumps of the plurality of elastic bumps of each second foil region is formed by embossing a part of the respective second foil region.

5. The airfoil journal bearing of claim 2, wherein the plurality of elastic bumps of each second foil region are formed by pressing the surface of the respective second foil region in certain areas while not pressing the surface in other areas such that in each respective second foil region, the pressed areas of the surface have a greater curvature than the other areas of the surface.

6. The airfoil journal bearing of claim 1, wherein, the first foil region has a first width parallel to the axial direction of the rotation shaft, the pair of second foil regions have a second width and a third width, respectively, the second width and the third width each being parallel to the axial direction of the rotation shaft, and the first width is greater than each of the second width and the third width.

7. The airfoil journal bearing of claim 1, wherein, the airfoil has a first airfoil edge extending along the circumferential direction of the airfoil, the first airfoil edge connected to the bearing housing as a fixed edge, and the airfoil has a second airfoil edge opposite to the first airfoil edge, the second airfoil edge being a free edge.

8. The airfoil journal bearing of claim 7, wherein the bearing housing includes an insert groove in the inner circumferential surface of the bearing housing, and the airfoil includes, at the first airfoil edge, a first insert part that extends outwardly from the airfoil toward the inner circumferential surface of the bearing housing and is inserted into the insert groove.

9. The airfoil journal bearing of claim 8, wherein when the rotation shaft is inserted through the hollow, the airfoil encloses, at least once, the outer circumferential surface of the rotation shaft, and the airfoil includes, at the second airfoil edge, a second insert part that is inserted into the insert groove through a hole in or near the first insert part.

10. The airfoil journal bearing of claim 1, wherein the first foil region and the second foil regions each have a length in the circumferential direction of the rotation shaft, wherein the respective lengths are substantially the same for the first foil region and the second foil regions.

11. The airfoil journal bearing of claim 1, wherein, when the rotation shaft is inserted through the hollow, the first foil region and the pair of second foil regions extend at least 360 degrees around the outer circumferential surface of the rotation shaft.

12. The airfoil journal bearing of claim 1, wherein the airfoil further comprises:

a coating layer comprising a polytetrafluoroethylene (PTFE) material coated on an inner surface of the first foil region facing the outer circumferential surface of the rotation shaft.

13. The airfoil journal bearing of claim 1, wherein the first foil region includes a third foil region having a plurality of elastic bumps that, when the rotation shaft is inserted through the hollow, extend in the circumferential direction of the rotation shaft.

14. An airfoil journal bearing comprising:

a bearing housing having an inner circumferential surface forming a hollow through which a rotation shaft is insertable, and when the rotation shaft is inserted through the hollow, a gap is formed between the inner circumferential surface of the bearing housing and an outer circumferential surface of the rotation shaft, and an airfoil that, when the rotation shaft is inserted through the hollow, is in the gap, the airfoil having a first airfoil edge fixed to the bearing housing and a second airfoil edge, opposite to the first airfoil edge, either fixed to the bearing housing or free, wherein the airfoil comprises:

a first foil region that, when the rotation shaft is inserted through the hollow, is configured to receive pressure generated by rotation of the rotation shaft, wherein the first foil region extends in a circumferential direction of the rotation shaft in a range from 180 to 360 degrees around the rotation shaft, the first foil region having a first edge in a first axial direction of the rotation shaft and a second edge in a second axial direction of the rotation shaft that is opposite to the first axial direction, and a pair of second foil regions that, when the rotation shaft is inserted through the hollow, extend in in the circumferential direction in a range from 180 to 360 degrees around the rotation shaft, each second foil region comprising a plurality of elastic bumps in the circumferential direction of the rotation shaft on a surface of the respective second foil region and elastically operating by pressure upon the rotation of the rotation shaft, wherein a first of the second foil regions of the pair of second foil regions extends from the first edge of the first foil region and a second of the second foil regions of the pair of second foil regions extends from the second edge of the first foil region, wherein the first foil region has a smooth curved surface between the first edge and the second edge that is wider in the first axial direction than each of the pair of second foil regions, and wherein the airfoil is formed from a single member.

15. The airfoil journal bearing of claim 14, wherein the bearing housing includes an insert groove in the inner circumferential surface of the bearing housing, and the airfoil includes an insert part configured to be inserted into the insert groove, the insert part formed at the first airfoil edge of the airfoil and extending toward the inner circumferential surface of the bearing housing for insertion thereto.

16. The airfoil journal bearing of claim 14, wherein the airfoil is formed from a single member by processing the single member to form the plurality of elastic bumps in each second foil region, and rolling the processed single member in a circumferential direction.

17. The airfoil journal bearing of claim 14, wherein, each of the elastic bumps of the plurality of elastic bumps of each second foil region has a protruding shape that, when the rotation shaft is inserted through the hollow, extends from the outer circumferential surface of the rotation shaft toward the inner circumferential surface of the bearing housing.

18. A mechanical device comprising:
a housing;
a motor inside the housing and including a rotation shaft extending in an axial direction;
an impeller coupled to the rotation shaft and configured to rotate by operation of the motor; and
an airfoil journal bearing for rotatably supporting the rotation shaft, the airfoil journal bearing comprising:
  a bearing housing having an inner circumferential surface forming a hollow through which the rotation shaft is inserted; and
  an airfoil in the hollow, forming, when the rotation shaft is rotating, an air layer between the airfoil and an outer circumferential surface of the rotation shaft, and extending along the inner circumferential surface of the bearing housing, the airfoil comprising:
    a first foil region having a smooth curved surface; and
    a pair of second foil regions respectively at edges of the first foil region and including a plurality of elastic bumps along a circumference of the airfoil and configured to generate elastic force upon the rotation of the rotation shaft,
wherein the smooth curved surface of the first foil region is wider in the axial direction of the rotation shaft than each of the pair of second foil regions, and
wherein the first foil region and the second foil regions are integrally formed.

* * * * *